United States Patent [19]
Barnett et al.

[11] 3,942,226
[45] Mar. 9, 1976

[54] LENS MOUNTING CLIPS

[75] Inventors: Barry Roger Michael Barnett, West Drayton; Gerald Francis Alley, Ickenham; Brian Arthur Saunders, Hayes, all of England

[73] Assignee: TRW Inc., Cleveland, Ohio

[22] Filed: Dec. 5, 1974

[21] Appl. No.: 530,029

[30] Foreign Application Priority Data
Dec. 1973 United Kingdom................56907

[52] U.S. Cl............................. 24/208 A; 248/27 A
[51] Int. Cl.² ..................... A44B 17/00; G12B 9/00
[58] Field of Search........... 248/27; 24/208 A, 73 P, 24/73 PF

[56] References Cited
UNITED STATES PATENTS

| | | | |
|---|---|---|---|
| 1,398,373 | 11/1921 | Graesser et al. | 248/27 |
| 2,004,786 | 6/1935 | Gaus | 248/27 UX |
| 2,140,443 | 12/1938 | Clark | 248/27 |
| 2,223,273 | 11/1940 | Slessman | 248/27 X |
| 2,244,977 | 6/1941 | Hansman et al. | 248/27 X |
| 2,352,591 | 6/1944 | Wallerstein | 248/27 UX |
| 2,424,757 | 7/1947 | Klumpp | 248/27 UX |
| 3,067,974 | 12/1962 | Baldwin | 248/27 |
| 3,272,461 | 9/1966 | Larkin | 248/27 |

*Primary Examiner*—Donald A. Griffin
*Attorney, Agent, or Firm*—James R. O'Connor

[57] ABSTRACT

A clip for mounting a disc in an aperture in a panel. The clip has a tubular body portion which can be inserted in the aperture in the panel. Projections on the body portion limit insertion of the clip through the aperture while additional projections spaced from the first mentioned projections are adapted to engage the panel and retain the clip in position. The disc is retained within the body portion of the clip.

5 Claims, 4 Drawing Figures

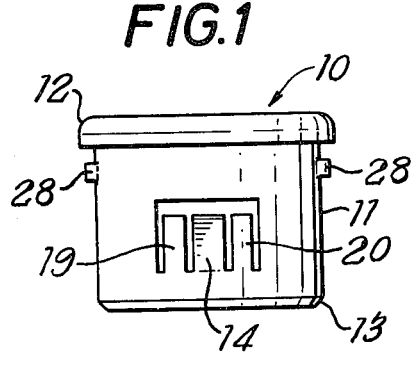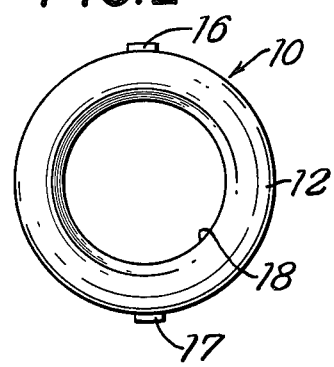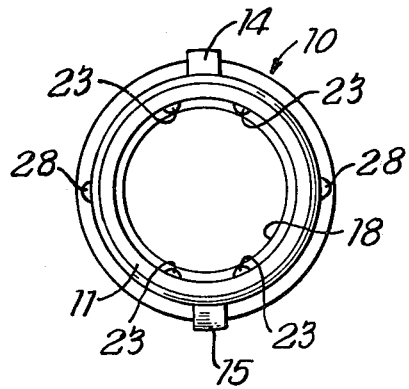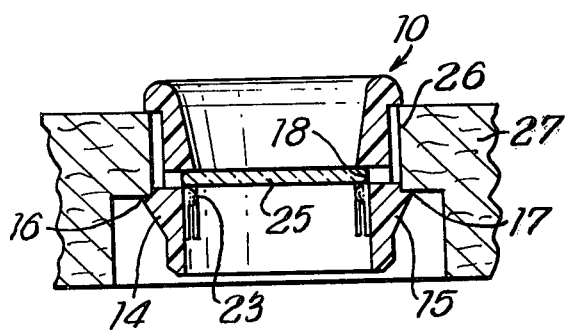

LENS MOUNTING CLIPS

BACKGROUND OF THE INVENTION

The present invention relates to a clip for mounting a disc, which may comprise a lens, in an aperture in a panel.

There is a need in the vehicle industry for a unitary clip which can be economically manufactured and which is easy to assemble for mounting a disc such as a lens in the fascia or dashboard of a vehicle, for instance over a warning light such as an ignition or an oil warning light.

It is an object of the present invention to provide a clip for this purpose.

STATEMENT OF THE INVENTION

According to the present invention there is provided a clip for mounting a disc in an aperture in a panel, comprising a tubular body portion which can be inserted through the aperture in the panel, an external abutment on the tubular body portion adapted to limit insertion of the body portion of the clip through the aperture, means on the body portion spaced from the external abutment and adapted to engage the panel and retain the clip in position, and means within the body portion for holding a disc within the body portion.

Preferably, the means for holding the disc comprises an internal circumferential rib and a plurality of resilient tongues having their end faces spaced from and facing the rib, the disc being trapped in use between the rib and the end faces of the tongues.

Preferably also, the means spaced from the external abutment comprise a plurality of resilient, radially compressible external projections. The projections are compressed to allow the body portion to pass through the aperture in the panel and then spring radially outwardly to retain the clip in position in the aperture in the panel.

BRIEF DESCRIPTION OF THE DRAWINGS

FIG. 1 is an elevation of a clip according to the present invention;

FIG. 2 is a plan view of the clip shown in FIG. 1;

FIG. 3 is an underplan of the clip shown in FIG. 1, and

FIG. 4 is an elevation, in section, showing a lens mounted in an aperture in a panel with the aid of the clip of FIGS. 1 to 3.

DESCRIPTION OF THE PREFERRED EMBODIMENT

In the drawings a clip is indicated generally at 10 which is formed from a suitable synthetic plastics material as a unitary injection moulding.

The clip 10 comprises a tubular body portion 11 which has an external abutment at one end in the form of an external circumferential flange 12. The other end of the body portion 11 has a chamfered external edge 13 which provides a good lead-in for the clip into an aperture in a panel.

Spaced from the flange 12 are two external projections on the body portion 11 in the form of resilient lugs 14 and 15. Each lug 14 and 15 has an end face having a notch 16 and 17 respectively which is spaced from but faces the flange 12. The lugs 14 and 15 are radially compressible into the wall of the tubular portion 11 and have flat external surfaces which slope outwardly and away from the chamfered end 13 of the clip.

The internal surface of the body portion 11 tapers from the flange 12 to an internal circumferential rib 18 and from the rib 18 to the chamfered end 13 is substantially cylindrical.

Spaced from the rib 18 is means for clamping a lens against the rib 18 in the form of four similar resilient tongues 19, 20, 21 and 22.

The tongues 19 and 20 are positioned one on each side of the lug 14 and the tongues 21 and 22 are positioned one on each side of the lug 15. The tongues 19 to 22 are resilient and can be moved radially inwardly and outwardly of the wall of the body portion. Each tongue 19 to 22 carries an inwardly extending projection 23, which is spaced from the rib 18 and which is adapted to clamp a lens or similar dish shaped object against the rib 18.

As can be seen best from FIG. 1, the end faces of the tongues 19 to 22 lie in approximately the same plane as the end faces of the lugs 14 and 15 so that movement of the lugs 14 and 15 is not inhibited by a lens of disc shaped object trapped between the projections 23 and the rib 18.

The clip 10 is used, as shown in FIG. 4, to mount a lens 25 in an aperture 26 in a panel 27 which may for instance be the fascia of a vehicle.

In order to mount the lens 25 in the aperture 26 in the panel 27, the lens 25 is first mounted in the clip 10 by pressing the lens into the body portion of the clip from the chamfered end 13 until the lens is seated against the rib 18.

As the lens passes along the tubular body portion 11, it meets the projections 23 on the tongues 19 to 22 and the tongues 19 to 22 are deflected radially outwardly. When the lens 25 is seated against the rib 18 the tongues 19 to 22 return inwardly so that the projections 23 clamp the lens 25 securely against the rib 18.

When the lens is mounted in the clip 10, the clip 10 is offered to the aperture 26 in the panel 27 and the body portion 11 is pushed into the aperture 26, chamfered end 13 first. As the tubular body portion 11 passes through the aperture 26, the lugs 14 and 15 are pressed radially inwardly of the body portion, behind the lens 25. As soon as the lugs 14 and 15 pass through the aperture 26, the lugs spring radially outwardly, and the notches 16 and 17 locate on the rim of the panel 27 to resist removal of the clip 10 and lens 25 from the panel. At the same time the flange 12 is seated against the outer surface of the panel 27 so that the panel is trapped between the flange 12 and the lugs 14 and 15.

In order to accommodate substantial variations in the size of the aperture 26, the external diameter of the body portion 11 is substantially less than the diameter of the aperture and two pips 28 are formed on the outer surface of the body portion between the flange 12 and the lugs 14, 15. The pips 28 centralise the body portion 11 in the aperture and can be readily flattened to take up variations in the diameter of the aperture 26.

It will be seen from the above, that the clip 10 provides a simple unitary clip which can be readily injection moulded from a synthetic plastics material and which will securely mount a lens 25 in an aperture in a panel. The clip 10 is particularly useful for mounting a lens in the dashboard of a vehicle, for instance the lens of a warning light such as an ignition light or oil warning light.

It will be appreciated that various modifications may be made to the embodiment described herein without departing from the spirit and scope of the invention.

We claim:

1. A clip for mounting a disc in an aperture in a panel, comprising a tubular body portion which can be inserted through the aperture in the panel, and external abutment on said tubular body portion adapted to limit insertion of said body portion of the clip through the aperture, resiliently, radially compressible external projections on said body portion spaced from said external abutment and adapted to engage the panel and retain the clip in position, an internal rib on said body portion, and a plurality of resilient tongues extending from the internal surface of the body portion, each tongue having a free end face spaced from and facing the rib, the disc being trapped, in use, between the rib and the end faces of the tongues, said rib being disposed in a plane lying between the plane of the end faces of the resilient tongues and the plane of the external abutment.

2. The clip of claim 1 wherein said external abutment comprises a circumferential flange.

3. The clip of claim 1 wherein each of said external projections has an external surface which slopes outwardly towards the external abutment.

4. The clip of claim 1 wherein each of said projections has a notch at its free end.

5. The clip of claim 1 wherein the external projections have end faces which lie in the same plane as the end faces of the resilient tongues.

* * * * *